Dec. 3, 1935. W. B. KIRKPATRICK 2,022,937
TREE BAND
Filed Feb. 6, 1935

Fig. 3.  Fig. 4. 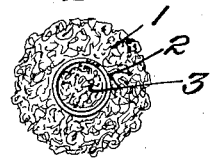
Fig. 5. Fig. 6.
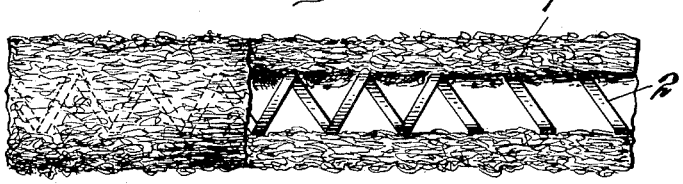 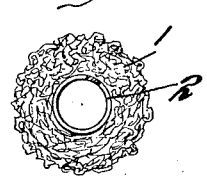
Fig. 7. Fig. 8.
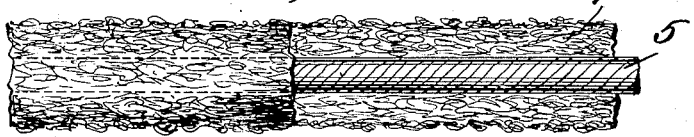
INVENTOR
Willis B. Kirkpatrick
BY
ATTORNEY Patented Dec. 3, 1935

2,022,937

UNITED STATES PATENT OFFICE 2,022,937

TREE BAND

Willis B. Kirkpatrick, Scarsdale, N. Y.

Application February 6, 1935, Serial No. 5,194

10 Claims. (Cl. 47—24)

This invention relates to tree bands to stop insects crawling from the ground up the trunk of a tree to the foliage, and has for its object to improve upon and simplify devices heretofore proposed for this purpose.

A common form of tree band comprises a fabric band, ordinarily of burlap or paper, which is tied or tacked to the tree to be protected, and having viscous insect-holding composition smeared on the outside. This type of band has several defects. One is that the band, simply wrapped around the tree, with or without tension, fails to fill the interstices in a tree having rough bark or irregular cross section; it is objectionable to the tree; and it is disapproved by tree surgeons to smooth off the bark before applying such a band. Also textile fabrics such as burlap, or soft wool, cotton and twisted or braided textile bands have the further objection of being absorbent to and holding water even after being impregnated with the viscous, sticky material. Hence, such bands absorb and hold water, lead to bark decay, and are ineffective to stop the progress of the insects unless the bark of the tree is particularly smooth and the band tightly applied. When tightly applied the contour of the tree is not fitted. Also, such bands do not allow for the normal growth of the tree, are unsightly, and only partially effective, because the soft material next to the bark makes a harbor for injurious insects.

I have found that the viscous materials furnished by manufacturers for trapping worms and other creeping insects quickly lose their effectiveness when applied to water-absorbent textile fabric or paper bands, and in any event have to be renewed yearly, and in many cases several times a year during the crawling insect season, in order to have any value at all.

In order to do away with the objectionable effects to trees of absorbing and holding water in a water absorbent band, it has been proposed to protect them by means of expansible metallic hoods, but besides being expensive, it has been found difficult to cut and fit such hoods to the individual trees, and also to protect the enclosed fabric material from moisture. Furthermore, such hoods and fabric combinations are hard to apply and are unsightly after being applied, besides not completely preventing passage of the insects without being caught by the viscous material.

I have found that an effective tree band should have the following characteristics:

Formable to fit in the bark interstices and the contour of the tree, and extensible to allow the growth of the tree, without injury to tree or band.

Length easily adaptable to the circumference of the tree to be protected, and easily applied and fastened.

Material not absorbent to water and easily impregnated with the viscous material.

Capable of being applied by unskilled labor.

Appearance on the tree as inconspicuous as possible. The particular material I prefer takes on a greenish color that seems to blend into the color of the tree and the band is not noticeable a few feet away.

After considerable experience with present tree bands as advocated and recommended by various departments, civic organizations, foresters and parkway managers, I have discovered a tree band to overcome the objections of those previously advocated which has a number of outstanding advantages, such as cheapness, ease of conforming to the irregularities of the tree surface, ease of application, non-retention of moisture and overall effectiveness in preventing passage of the insects which it is desired to control.

The material which I have found as having particular utility for this purpose is loosely bound inorganic wool formed into a loose rope, strip, band or the like, which does not absorb and hold moisture, holds the viscous material, is readily deformable or set by slight pressure to fit the inequality of the tree, can be cut off to the desired length to fit the circumference of each individual tree, and can be readily applied and fastened by ordinary labor. While mineral wool, glass wool and similar non-metallic materials can be used, I have found special advantages in metal, and preferably non-rusting wool, of which steel wool commonly used for scouring and other abrasive purposes, is a common example. Preferably, where long service is desired, I use bronze, brass or other non-rusting wool made from pure metals or alloys, formed into a loose rope or band, capable of being thoroughly impregnated with the viscous material in a container and pulled off and cut to the desired length to fit each individual tree. Such a material holds its shape when deformed on the surface of the tree, and has the quality of clinging to the bark.

Inasmuch as extensibility to fit the growth of the tree is of importance, I find that the natural extensibility of a rope, band or the like, of metal wool can be augmented by incorporating same in and around an extensible core, which core may be of a loosely twisted fibre (because not in contact with the bark), but preferably the core consists of a coiled wire embedded in and interlocked with the metal wool fibres. The metal wool fibres can be inside as well as outside of the coiled wire or can all be outside, in which latter case the interior of the coil furnishes more of a reservoir for the viscous material. A coiled resilient core also has the advantage of pressing the metal fibres into the crevices of the bark.

In practice such a tree band material can be made up in a metal wool plant in the form of a rope, band or the like, then impregnated with the viscous material and coiled in a can from which it can be pulled out and cut off into the length desired to fit each individual tree.

Such a material also is easy to attach at one end to a tree by means of a staple having a long and a short arm, brought around in close contact with the tree and engaged with the short arm and then both arms of the staple driven into the bark to complete the fastening.

Also, it is within this invention to fit and apply such an elastic band, rope or the like of metal wool to the tree and then apply the viscous insect-catching material.

In the accompanying drawing, Fig. 1 shows a tree with my improved band attached thereto;

Fig. 3 shows a longitudinal view partly in section of the preferred form including a coiled extensible core;

Fig. 4 is a cross section;

Fig. 5 shows a variation in which a coiled elastic core is enclosed within a tube of metal wool;

Fig. 6 is a cross section;

Fig. 7 shows a modification in which a solid but extensible textile or non-textile core is provided;

Fig. 8 is a cross section; and

Figure 1:
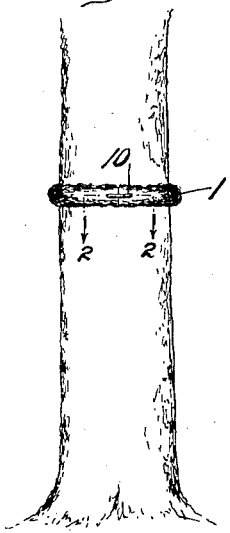
Figure 2:
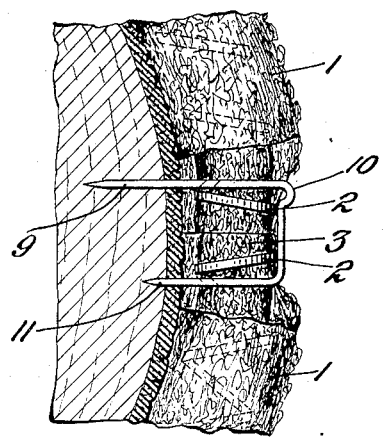
Fig. 2 shows a section through the joint and tree.
Figure 9:
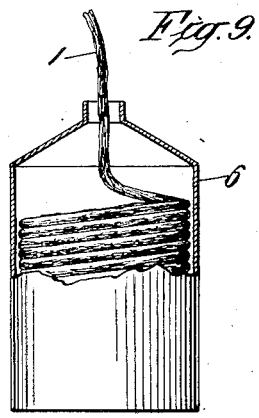
Fig. 9 is a sectional view showing a container carrying the viscous material with the improved band coiled therein.

Referring to the figures, 1 represents the band proper composed of non-textile wool such as mineral or glass wool, but preferably of non-rusting ferrous or non-ferrous metallic wool, similar to steel wool, enclosing and being within a spiral extensible or hollow core 2. In Figs. 3 and 4 the interior of the spiral is filled with similar wool 3, whereas in Figs. 5 and 6 the interior of the spiral is free of wool.

In Figs. 7 and 8, 5 is an extensible core which may be of loosely twisted textile material inasmuch as it does not come in contact with the tree, but in general a loose twisted core such as 5 gives better results if also of inorganic material which will neither absorb moisture nor tend to rot under the stated conditions.

In applying the new band, the circumference of the tree is approximately ascertained, then a suitable length pulled out of the can or other container 6 and cut off. One end is applied to the tree and the long end 9 of staple 10 passed through the end of the band and partly driven into the bark to hold the end on the tree and then the other end is brought around and contacts with the first end. Short end 11 of the staple 10 is passed therethrough and then the staple fully driven into the bark. In passing the staple through the core the ends are thus held against separation and a butt, lapped, or beveled joint in the band can be made as desired. The band clings to the bark, and is easily deformable by outside pressure, or even in special cases can be deformed to irregular curvature of the particular tree before being applied. Unusual crevices can be specially packed with this material. The band is extensible owing to the stretch in the metal wool and in the core to permit the natural growth of the tree without setting up objectionable tension. It is also seen that by reason of the effective intertwining of the irregular metal fibres with the coiled core, both a good bond and durability are obtained in handling for application, as well as subsequently.

The cross section of the novel inorganic tree band herein disclosed, whether of metal or non-metal, and with or without a core, can be varied as desired, but in general I prefer a reasonably round surface against the tree, with the metal fibres projecting to give a clinging effect, and have found that a band according to this invention giving approximately one inch contact with the tree is more effective in protecting the tree than four inch flat burlap or paper bands commonly used, avoids the disadvantages of the latter by accommodating itself to the growth of the tree, not holding moisture, and sightliness. Also, leaves cannot bridge it on account of the round exposed surface.

The invention is capable of various modifications, and I do not restrict myself to the examples shown except as required by the appended claims.

The invention claimed is:

1. A tree band comprising an inorganic wool in attenuated form for encircling a tree.

2. A tree band comprising an inorganic wool in attenuated form and having its interstices carrying a viscous insect holding material.

3. A tree band comprising a metal wool in attenuated rope like or strip form.

4. A tree band comprising an attentuated core and an associated metal wool.

5. A tree band comprising an elastic core and an associated metal wool.

6. A tree band comprising a coiled resilient core and an associated metal wool.

7. A tree band comprising a coiled resilient core and an associated metal wool interlaced therewith.

8. A tree band comprising an inorganic wool in attenuated form, and fastening means.

9. A tree band comprising a metal wool, an elastic deformable core, and fastening means penetrating the core and joining the band ends.

10. A tree band comprising an elastic core enclosed by metallic wool and impregnated with viscous insect holding material.

WILLIS B. KIRKPATRICK.